US009083055B2

United States Patent
Choi et al.

(10) Patent No.: US 9,083,055 B2
(45) Date of Patent: Jul. 14, 2015

(54) ELECTRODE WITH PLURAL ACTIVE MATERIAL LAYERS WITH DIFFERENT AMOUNTS OF CONDUCTIVE MATERIAL FOR RECHARGEABLE LITHIUM BATTERY AND METHOD FOR MANUFACTURING THE SAME AND RECHARGEABLE LITHIUM BATTERY INCLUDING THE ELECTRODE

(75) Inventors: Nam-Soon Choi, Suwon-si (KR); Sae-Weon Roh, Suwon-si (KR); Yong-Chul Park, Suwon-si (KR); Sung-Soo Kim, Suwon-si (KR); So-Hyun Hur, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 403 days.

(21) Appl. No.: 12/575,419

(22) Filed: Oct. 7, 2009

(65) Prior Publication Data
US 2010/0285356 A1 Nov. 11, 2010

Related U.S. Application Data (60) Provisional application No. 61/176,847, filed on May 8, 2009.

(51) Int. Cl.
*H01M 4/04* (2006.01)
*H01M 4/13* (2010.01)
(Continued)

(52) U.S. Cl.
CPC ........ *H01M 10/0525* (2013.01); *H01M 4/0435* (2013.01); *H01M 4/366* (2013.01);
(Continued)

(58) Field of Classification Search
CPC ... H01M 4/366; H01M 4/0435; H01M 4/505; H01M 4/525; H01M 10/0525; H01M 2004/021; Y10T 156/10
USPC ........................................................ 429/209
See application file for complete search history.

(56) References Cited

U.S. PATENT DOCUMENTS

2006/0099495 A1 5/2006 Suzuki et al.
2006/0127773 A1* 6/2006 Kawakami et al. ........... 429/245
(Continued)

FOREIGN PATENT DOCUMENTS

CN 1964101 A 5/2007
CN 101300695 A 11/2008
(Continued)

OTHER PUBLICATIONS

Ishizuka et al., Machine translation of JP 2005-259708 A, Sep. 2005.*
(Continued)

*Primary Examiner* — Sean P Cullen
(74) *Attorney, Agent, or Firm* — Knobbe, Martens, Olson & Bear, LLP (57) ABSTRACT

An electrode for a rechargeable lithium battery and method of manufacturing a rechargeable lithium battery including the electrode is disclosed. In one embodiment, the electrode includes i) a current collector, ii) a first electrode composition layer provided on a surface of the current collector and iii) a second electrode composition layer farther than the first electrode composition layer from the current collector. Further, each of the first and second electrode composition layers comprises an active material and a conductive material, and wherein the amount of the conductive material of the first electrode composition layer is different from that of the conductive material of the second electrode composition layer. The electrode further includes an additional first electrode composition layer farther than the second electrode composition layer from the current collector and an additional second electrode composition layer farther than the additional first electrode composition layer from the current collector.

17 Claims, 6 Drawing Sheets

(51) Int. Cl.
H01M 4/139 (2010.01)
H01M 4/62 (2006.01)
H01M 10/0525 (2010.01)
H01M 4/36 (2006.01)
H01M 4/505 (2010.01)
H01M 4/525 (2010.01)
H01M 4/02 (2006.01)

(52) U.S. Cl.
CPC ............ H01M 4/505 (2013.01); H01M 4/525 (2013.01); H01M 2004/021 (2013.01); Y02E 60/122 (2013.01); Y10T 156/10 (2015.01)

(56) References Cited

U.S. PATENT DOCUMENTS

2008/0318133 A1* 12/2008 Matsuyama et al. .......... 429/300
2009/0139787 A1*  6/2009 Ohsawa et al. .............. 180/68.5

FOREIGN PATENT DOCUMENTS

| CN | 101330138 A | | 12/2008 |
|----|-------------|---|---------|
| EP | 1 953 851 A1 | | 8/2008 |
| JP | 09-306471 A | | 11/1997 |
| JP | 2005259708 A | * | 9/2005 |
| JP | 2007-157694 A | | 6/2007 |
| JP | 2008-034215 | | 2/2008 |
| JP | 2008-059876 A | | 3/2008 |
| JP | 2009-004181 A | | 1/2009 |
| JP | 2009-043703 A | | 2/2009 |
| WO | WO 2007055267 A1 | * | 5/2007 |

OTHER PUBLICATIONS

European Search Report dated Aug. 30, 2010.
Chinese Office Action dated May 15, 2012 for Chinese Patent Application No. CN 200910261533.4 which claims priority from captioned U.S. Appl. No. 12/575,419 and corresponding U.S. Appl. No. 61/176,847.
Chinese Office Action dated May 14, 2013 for Chinese Patent Application No. CN 200910261533.4 which claims priority from U.S. Appl. No. 61/176,847, filed May 8, 2009; and captioned U.S. Appl. No. 12/575,419.
Chinese Office Action dated Nov. 14, 2012 for Chinese Patent Application No. CN 200910261533.4 which claims priority from U.S. Appl. No. 61/176,847, filed May 8, 2009, and captioned U.S. Appl. No. 12/575,419.
Korean Notice of Allowance dated Dec. 31, 2012 for Korean Patent Application No. KR 10-2009-0097317 which claims priority from of U.S. Appl. No. 61/176,847, filed May 8, 2009, and captioned U.S. Appl. No. 12/575,419.
Japanese Office Action dated Jun. 5, 2012 for Japanese Patent Application No. JP 2010-027620 which shares priority of U.S. Appl. No. 61/176,847 with captioned U.S. Appl. No. 12/575,419.
Japanese Office Action dated Feb. 26, 2009 for Japanese Patent Application No. JP 2010-027620 which claims priority from U.S. Appl. No. 61/176,847, filed May 8, 2009, and captioned U.S. Appl. No. 12/575,419.

* cited by examiner

ELECTRODE WITH PLURAL ACTIVE MATERIAL LAYERS WITH DIFFERENT AMOUNTS OF CONDUCTIVE MATERIAL FOR RECHARGEABLE LITHIUM BATTERY AND METHOD FOR MANUFACTURING THE SAME AND RECHARGEABLE LITHIUM BATTERY INCLUDING THE ELECTRODE

CROSS-REFERENCE TO RELATED APPLICATION

This application claims priority to and the benefit of Provisional Patent Application No. 61/176,847 filed in the U.S. Patent and Trademark Office on May 8, 2009, the entire contents of which are incorporated herein by reference.

BACKGROUND OF THE INVENTION

1. Field of the Invention

This disclosure relates to an electrode for a rechargeable lithium battery, a method of manufacturing the same, and a rechargeable lithium battery including the electrode.

2. Description of the Related Technology

Batteries transform chemical energy generated from an electrochemical oxidation-reduction reaction of chemical materials inside the battery into electrical energy. The batteries are divided into primary batteries, which should be discarded after the energy inside the batteries is all consumed, and rechargeable batteries, which can be recharged several times.

Among the batteries, the rechargeable battery may be charged/discharged several times through reversible transformation between chemical energy and electrical energy. Recent development in high-end electronic industries makes electronic devices smaller and lighter and this leads to an increase in portable electronic devices. Since the portable electronic devices demands for batteries with high energy density, researchers are studying vigorously to develop rechargeable lithium battery.

SUMMARY OF CERTAIN INVENTIVE ASPECTS

One aspect of the present invention is a positive electrode for a rechargeable lithium battery, a method of manufacturing the same, and rechargeable lithium battery including the positive electrode.

Another aspect of the present invention is a positive electrode for a rechargeable lithium battery being capable of forming thickly without cracks on a surface of electrodes.

Another aspect of the present invention is a positive electrode for a rechargeable lithium battery that includes a current collector, a first positive electrode composition layer provided on at least one surface of the current collector, and a second positive composition layer provided on the first positive composition layer, wherein each of the first positive electrode composition layer and the second positive electrode composition layer includes a positive active material, a conductive material, and a binder, and wherein the first positive electrode composition layer has higher amount of conductive material than that of the second positive electrode composition layer.

Another aspect of the present invention is a method of manufacturing a positive electrode for a rechargeable lithium battery that includes: providing a first positive electrode composition and a second positive electrode composition, wherein each of them includes a positive active material, a binder, and a conductive material and has different an amount of conductive material; providing a first positive electrode composition layer including the first positive electrode composition and a second positive electrode composition layer including the second positive electrode composition; disposing the first positive electrode composition layer on at least one surface of the current collector and disposing the second positive electrode composition layer on the first positive electrode composition layer; and pressing the current collector, the first positive electrode composition layer, and the second positive electrode composition layer.

Another aspect of the present invention is a rechargeable lithium battery that includes a positive electrode, a negative electrode, and a electrolyte, wherein the positive electrode includes a current collector, a first positive electrode composition layer formed on at least one surface of the current collector, and a second positive electrode composition layer formed on the second positive electrode composition layer; each of the first positive electrode composition layer and the second positive electrode composition layer includes a positive active material, a binder, and a conductive material; and the first positive electrode composition layer has a higher amount of conductive material than that of the second positive electrode composition layer.

The first positive electrode composition layer may have a higher amount of the conductive material than that of the positive active material. The conductive material of the first positive electrode composition layer may be included in about 40 to 60 wt %, and the positive active material of the first positive electrode composition layer may be included in about 20 to 35 wt %.

The second positive electrode composition layer may include the positive active material in a higher amount than that of the conductive material. The positive active material of the second positive electrode composition layer may be included in about 80 to 95 wt %, and the conductive material of the second positive electrode composition layer may be included in about 1 to 10 wt %.

The current collector may be mesh-type. The first positive electrode composition layer may have a thickness of about 5 to about 200 µm, and the second positive electrode composition layer may have a thickness of about 100 to about 500 µm. The positive electrode may be thicker than about 300 µm. An average porosity of the positive electrode may be about 30% or more.

In the method of manufacturing a positive electrode for a rechargeable lithium battery, the step of pressing the current collector, the first positive electrode composition layer, and the second positive electrode composition layer may include thermal pressing from the both side of the current collector.

Another aspect of the present invention is an electrode for a rechargeable lithium battery, the electrode comprising: a current collector; a first electrode composition layer provided on a surface of the current collector; and a second composition layer farther than the first electrode composition layer from the current collector, wherein each of the first and second electrode composition layers comprises an active material and a conductive material, and wherein the amount of the conductive material of the first electrode composition layer is different from that of the conductive material of the second electrode composition layer.

In the above electrode, the amount of the conductive material of the first positive electrode composition layer is greater than that of the conductive material of the second electrode composition layer. In the above electrode, the first electrode composition layer comprises a higher amount of the conductive material than that of the positive active material.

In the above electrode, the second electrode composition layer comprises a higher amount of the active material than that of the conductive material. In the above electrode, the current collector is porous. In the above electrode, the current collector is mesh-type. In the above electrode, the electrode is a positive electrode. In the above electrode, the first electrode composition layer comprises about 40 wt % to about 60 wt % of the conductive material and about 20 wt % to about 35 wt % of the positive active material.

In the above electrode, each of the first and second electrode composition layers further comprises a binder, and wherein the first electrode composition layer comprises about 5 wt % to about 40 wt % of the binder. In the above electrode, the second electrode composition layer comprises about 80 wt % to about 95 wt % of the active material and about 1 wt % to about 10 wt % of the conductive material. In the above electrode, the first electrode composition layer has a thickness of about 5 μm to about 200 μm, and wherein the second electrode composition layer has a thickness of about 100 μm to about 500 μm.

In the above electrode, the positive electrode is thicker than about 300 μm. In the above electrode, the positive electrode has a thickness of about 300 μm to about 1200 μm. In the above electrode, the positive electrode has an average porosity of about 30% or more, and wherein the average porosity represents the total volume ratio of inside pores of the positive electrode. In the above electrode, the average porosity of the positive electrode is from about 30% to about 50%.

Still another aspect of the present invention is a method of manufacturing an electrode for a rechargeable lithium battery, comprising: providing a current collector; providing a first electrode composition and a second electrode composition, wherein each of the compositions comprises an active material and a conductive material and wherein each composition comprises a different amount of the conductive material; providing a first electrode composition layer comprising the first electrode composition and a second electrode composition layer comprising the second electrode composition; and providing the second electrode composition layer so that the first electrode composition layer is closer to the current collector than the second composition layer, so as to form an electrode for a rechargeable lithium battery.

The above method further comprises combining the current collector, the first electrode composition layer, and the second electrode composition layer so as to form an electrode for a rechargeable lithium battery. In the above method, the combining comprises substantially simultaneously pressing the current collector and the composition layers with a compressor from both sides of the current collector. In the above method, the pressing comprises thermal pressing performed at a temperature of about 150° C. to about 170° C.

In the above method, the providing of the first electrode composition layer comprises spraying or dipping the current collector. In the above method, the providing of the second electrode composition layer comprises forming the second electrode composition on a plate. In the above method, the first and second positive electrode compositions are prepared in a form of slurry.

Yet another aspect of the present invention is a rechargeable lithium battery, comprising: a positive electrode; a negative electrode; and a separator interposed between the positive and negative electrodes; wherein at least one of the positive and negative electrodes comprises: a current collector; a first electrode composition layer provided on a surface of the current collector; and a second composition layer farther than the first electrode composition layer from the current collector, wherein each of the first and second electrode composition layers comprises an active material and a conductive material, and wherein the amount of the conductive material of the first electrode composition layer is different from that of the conductive material of the second electrode composition layer.

In the above battery, the amount of the conductive material of the first positive electrode composition layer is greater than that of the conductive material of the second electrode composition layer. In the above battery, the first electrode composition layer comprises a greater amount of the conductive material than that of the active material. In the above battery, the at least one electrode is the positive electrode.

DETAILED DESCRIPTION OF CERTAIN INVENTIVE EMBODIMENTS

A rechargeable lithium battery is generally fabricated by injecting electrolyte into a battery cell, which includes a positive electrode including a positive active material capable of intercalating/deintercalating lithium ions and a negative electrode including a negative active material capable of intercalating/deintercalating lithium ions.

In order to realize large capacity batteries, positive and negative electrodes need to be formed thickly. However, when the electrodes are formed thickly, cracks may occur on a surface of the electrodes. Thus, electrode conductivity may be degraded and may have a bad effect on rechargeable battery performance.

Exemplary embodiments of the present invention will be described more fully hereinafter with reference to the accompanying drawings. In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

The positive electrode according to one embodiment and the rechargeable lithium battery including the same will be described with reference to FIG. 1 to FIG. 3.

Figure 1:
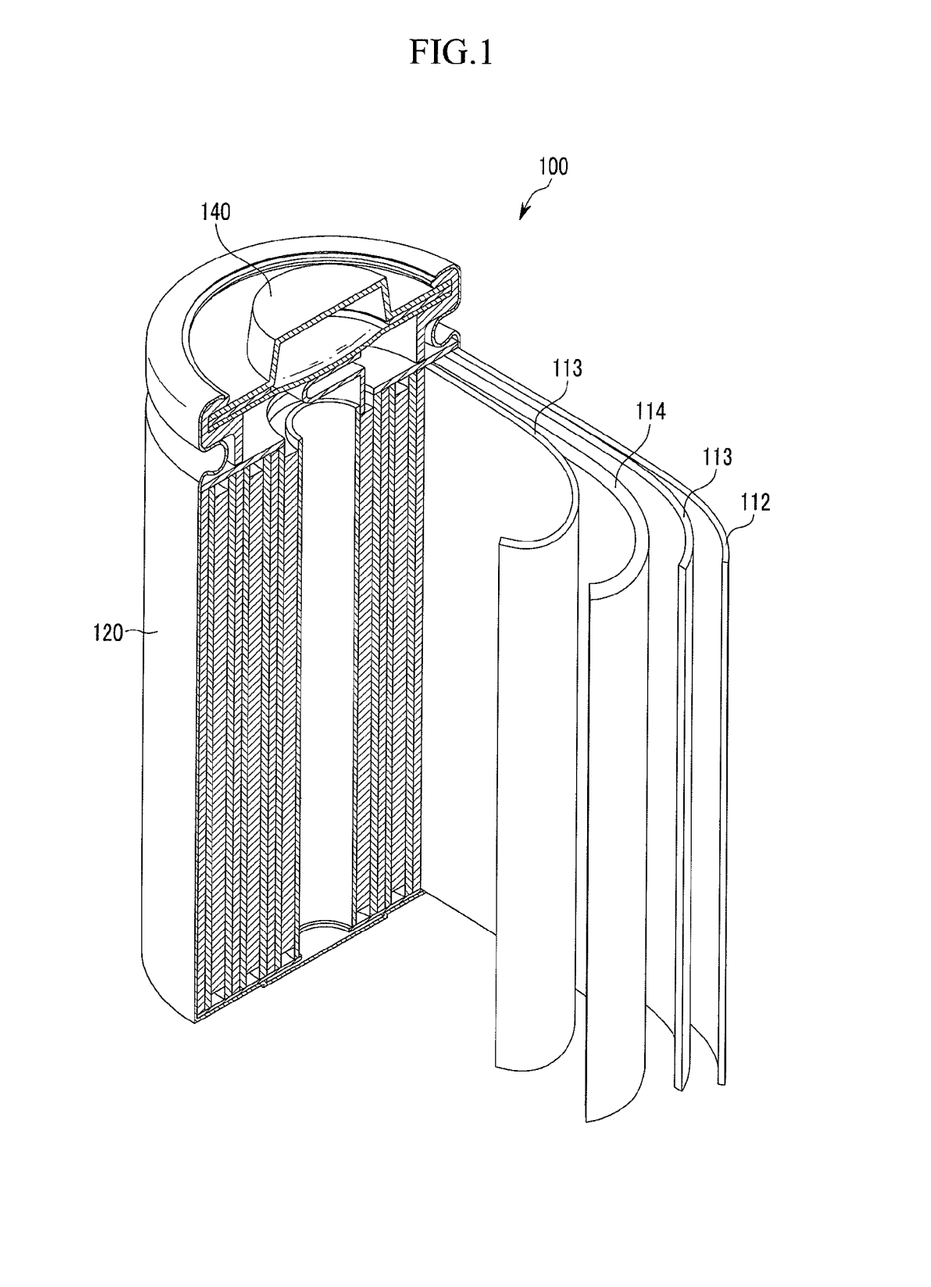
FIG. 1 is a schematic diagram showing a rechargeable lithium battery according to one embodiment of the present invention.

FIG. 1 is a schematic diagram showing a rechargeable lithium battery according to one embodiment; FIG. 2 is a schematic diagram showing a positive electrode according to one embodiment; FIG. 3A is a cross-sectional view showing the positive electrode shown in FIG. 2.

Referring to FIG. 1, the rechargeable lithium battery 100 includes a battery cell including i) a positive electrode 114, ii) a negative electrode 112 facing the positive electrode 114, iii)

a separator 113 interposed between the positive electrode 114 and negative electrode 112, iv) a battery case 120 and v) a sealing member 140 sealing the battery case 120. The battery 100 also includes an electrolyte (not shown) impregnating the positive electrode 114, negative electrode 112, and separator 113.

Figure 2:
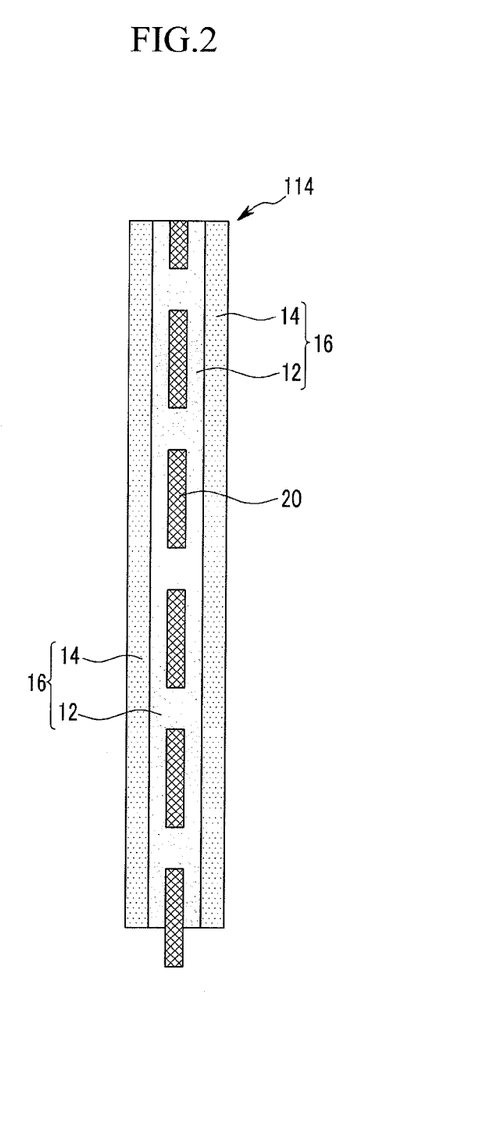
FIG. 2 is a schematic diagram showing a positive electrode according to one embodiment of the present invention.
Figure 3A:
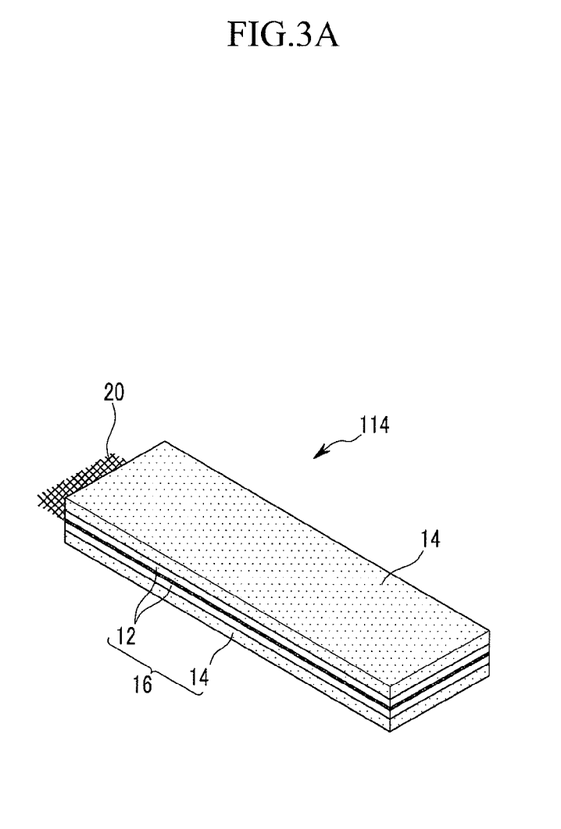
FIG. 3A is a cross-sectional view showing the positive electrode shown in FIG. 2.
Figure 3B:
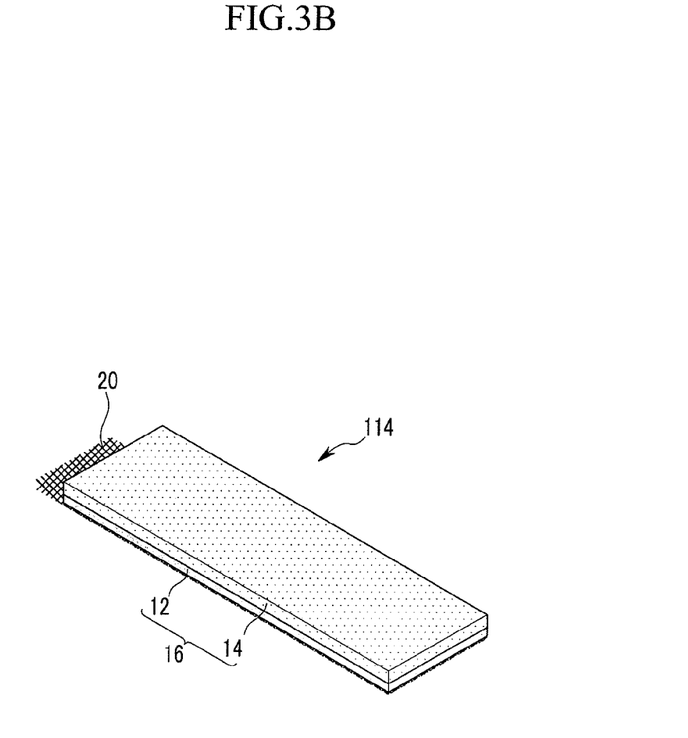
FIGS. 3B and 3C are cross-sectional views showing the positive electrode according to another embodiment of the present invention.
Figure 3C:
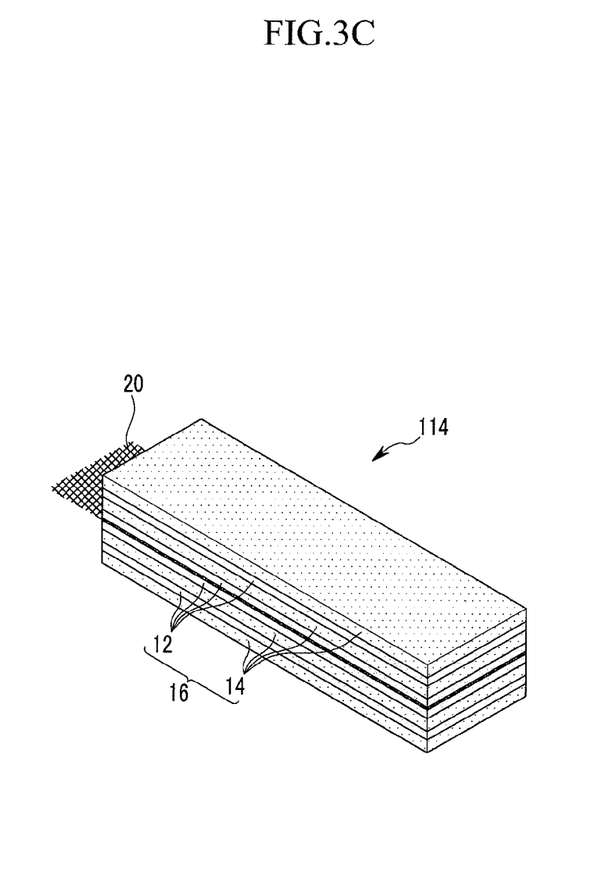

Firstly, a positive electrode 114 is described referring to FIG. 2 and FIG. 3A-3C. Referring to FIG. 2 and FIG. 3C, the positive electrode 114 includes a current collector 20 and positive electrode composition layers 16 provided on the both surfaces of the current collector 20.

The current collector 20 may be porous such as a mesh-type and may be made of metal such as aluminum (Al). When the current collector 20 is a mesh-type, it is possible to decrease the thickness of the current collector 20, so as to decrease the entire thickness of the positive electrode 114. In addition, the adhesive property of positive electrode composition layers 16 disposed on the both surfaces of the current collector 20 may be increased to prevent the positive electrode composition layers 16 from separating from the current collector 20 or cracking on a surface of the electrodes, so as to improve the battery performance.

The positive electrode composition layer 16 includes first positive electrode composition layers 12 disposed on the both surfaces of current collector 20 and second positive electrode composition layers 14 disposed on the outer surface of the first positive electrode composition layers 12. However, the number of the first positive electrode composition layer 12 and the second positive electrode composition layer 14 is not limited thereto. For example, as shown in FIGS. 3B and 3C, the first positive electrode composition layer 12 and the second positive electrode composition layer 14 may be provided on either one surface of current collector 20 or more than two of the first positive electrode composition layer 12 and the second positive electrode composition layer 14 may be formed on the current collector 20 as its center.

Each of the first positive electrode composition layer 12 and the second positive electrode composition layer 14 includes a positive active material, a binder, and a conductive material. In one embodiment, the first positive electrode composition layer 12 and the second positive electrode composition layer 14 have different component ratio of a positive active material, a binder, and a conductive material.

In one embodiment, the first positive electrode composition layer 12 disposed closer on the current collector 20 has a higher amount of conductive material than that of the second positive electrode composition layer 14.

In one embodiment, both conductivity and capacity are important to an electrode. To increase the capacity, a thick positive electrode may be used. In one embodiment, the positive electrode active material usually has low conductivity, the more the amount of the positive electrode active material increases, the more the conductivity of the electrode may decrease. In one embodiment, the conductivity of electrode is more important to an area disposed closer to a current collector because the current collector is where electric charges are collected.

In one embodiment, the positive electrode includes two layers having different amounts of conductive material and active material. In this embodiment, the area disposed closer to a current collector may include more conductive material than the area disposed farther from the current collector in order that electric charges may easily be transferred to the current collector. In one embodiment, since the conductivity is less important to the area disposed farther from a current collector, this area may include more electrode active material in order to provide sufficient capacity.

When the amount of the conductive material is increased in the first positive electrode composition layer 12 disposed closer on the current collector 20, it is possible to prevent from interrupting the electric charge transfer to the current collector 20, so as to ensure the conductivity even when the positive electrode composition layer 16 is formed in thicker to improve the battery performance. On the other hand, the second positive electrode composition layer 14 spacing from the current collector 20 may have relatively a low amount of conductive material to secure a sufficient amount of positive active material.

Furthermore, the first positive electrode composition layer 12 may include a higher amount of conductive material than that of the positive active material. The first positive electrode composition layer 12 may include, for example, about 20 wt % to about 35 wt % of the positive active material, about 40 wt % to about 60 wt % of the conductive material, and about 5 wt % to about 40 wt % of the binder.

In one embodiment, the second positive electrode composition layer 14 includes a higher amount of the positive active material than that of the conductive material. For example, the second positive electrode composition layer 14 may include about 80 wt % to about 95 wt % of the positive active material, about 1 wt % to about 10 wt % of the conductive material, and about 4 wt % to about 10 wt % of the binder.

The first positive electrode composition layer 12 may have a thickness of about 5 μm to about 200 μm; the second positive electrode composition layer 14 may have a thickness of about 100 μm to about 500 μm.

The entire thickness of positive electrode 114 may be thicker than about 300 μm, and may range from about 300 μm to about 1200 μm. Thereby, it is possible to provide a high capacity battery by including a positive electrode 114 having a thickness of more than about 300 μm.

In addition, the positive electrode 114 may have an average porosity of about 30% or more. The average porosity stands for the total volume ratio of inside pores of positive electrode and may be measured by Mercury porosimetry. The average porosity may be controlled by a pressing rate of the positive electrode. When it is more than about 30%, the impregnation region of the electrolyte is increased to facilitate the oxidation and reduction reaction of lithium in electrode, so as to ensure the stable life-cycle characteristic for a long time.

In one embodiment, the average porosity is beneficial to be between about 30% and about 50% in order to ensure high efficient charge and discharge characteristics, to ensure the oxidation and reduction reaction of lithium and the stable cycle-life characteristics, and to maintain the stable electric network between positive active materials.

In one embodiment, the usable positive active material, binder and conductive material are as follows:

For the positive active material, compounds being capable of reversibly intercalating and deintercalating lithium ions may be used without limitation. Examples of the positive active material may include composite oxide including lithium (Li) and a metal selected from the group consisting of cobalt (Co), manganese (Mn), nickel (Ni), and combinations thereof as follows:

$Li_aA_{1-b}D_bE_2$ wherein, in the above formula, $0.90 \leq a \leq 1.8$, and $0 \leq b \leq 0.5$; $Li_aG_{1-b}D_bO_{2-c}J_c$ wherein, in the above formula, $0.90 \leq a \leq 1.8$, $0 \leq b \leq 0.5$, and $0 \leq c \leq 0.05$; $LiG_{2-b}D_bO_{4-c}J_c$ wherein, in the above formula, $0 \leq b \leq 0.5$, and $0 \leq c \leq 0.05$; $Li_aNi_{1-b-c}Co_bD_cE_\alpha$ wherein, in the above formula, $0.90 \leq a \leq 1.8$, $0 \leq b \leq 0.5$, $0 \leq c \leq 0.05$, and $0 < \alpha \leq 2$; $Li_aNi_{1-b-c}Co_bD_cO_{2-\alpha}J_\alpha$ wherein, in the above formula, $0.90 \leq a \leq 1.8$, $0 \leq b \leq 0.5$, $0 \leq c \leq 0.05$, and $0 < \alpha < 2$; $Li_aNi_{1-b-c}Co_bD_cO_{2-\alpha}J_2$ wherein, in the above formula, $0.90 \leq a \leq 1.8$, $0 \leq b \leq 0.5$, $0 \leq c \leq 0.05$, and $0 < \alpha < 2$); $Li_aNi_{1-b-c}Mn_bD_cE_\alpha$ wherein, in the above formula, $0.90 \leq a \leq 1.8$, $0 \leq b \leq 0.5$, $0 \leq c \leq 0.05$, and $0 < \alpha \leq 2$; $Li_aNi_{1-b-c}Mn_bD_cO_{2-\alpha}J_\alpha$ wherein, in the above formula, $0.90 \leq a \leq 1.8$, $0 \leq b \leq 0.5$, $0 \leq c \leq 0.05$, and $0 < \alpha < 2$; $Li_aNi_{1-b-c}Mn_bD_cO_{2-\alpha}J_2$ wherein, in the above formula, $0.90 \leq a \leq 1.8$, $0 \leq b \leq 0.5$, $0 \leq c \leq 0.05$, and $0 < \alpha < 2$; $Li_aNi_bG_cL_dO_2$ wherein, in the above formula, $0.90 \leq a \leq 1.8$, $0 \leq b \leq 0.9$, $0 \leq c \leq 0.5$, and $0.001 \leq d \leq 0.1$; $Li_aNi_bCO_cMn_dL_eO_2$ wherein, in the above formula, $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiL_bO_2$ wherein, in the above formula, $0.90 \leq a \leq 1.8$, and $0.001 \leq b \leq 0.1$; $Li_aCoL_bO_2$ wherein, in the above formula, $0.90 \leq a \leq 1.8$, and $0.001 \leq b \leq 0.1$; $Li_aMnL_bO_2$ wherein, in the above formula, $0.90 \leq a \leq 1.8$, and $0.001 \leq b \leq 0.1$; $Li_aMn_2L_bO_4$ wherein, in the above formula, $0.90 \leq a \leq 1.8$, and $0.001 \leq b \leq 0.1$; $QO_2$; $QS_2$; $LiQS_2$; $V_2O_5$; $LiV_2O_5$; $LiRO_2$; $LiNiVO_4$; $Li_{(3-f)}Z_2(PO_4)_3 (0 \leq f \leq 2)$; $Li_{(3-f)}Fe_2(PO_4)_3 (0 \leq f \leq 2)$; and $LiFePO_4$.

In the above formulas, A is selected from the group consisting of Ni, Co, Mn, and combinations thereof; D is selected from the group consisting of Al, Ni, Co, Mn, Cr, Fe, Mg, Sr, V, a rare earth element, and combinations thereof; E is selected from the group consisting of O, F, S, P, and combinations thereof; G is selected from the group consisting of Co, Mn, and combinations thereof; J is selected from the group consisting of F, S, P, and combinations thereof; L is selected from the group consisting of Al, Cr, Mn, Fe, Mg, La, Ce, Sr, V, and combinations thereof; Q is selected from the group consisting of Ti, Mo, Mn, and combinations thereof; R is selected from the group consisting of Cr, V, Fe, Sc, Y, and combinations thereof; and Z is selected from the group consisting of V, Cr, Mn, Co, Ni, Cu, and combinations thereof.

The binder improves binding properties of the positive active material particles to one another, and also with a current collector. Any material may be used for the binder without limitation if it does not causes a chemical change and improves adhesive property. Examples of the binder include polyvinyl alcohol, carboxylmethyl cellulose, hydroxypropyl cellulose, diacetyl cellulose, polyvinyl chloride, carboxylated polyvinyl chloride, polyvinyl difluoride, an ethylene oxide-containing polymer, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, and nylon. In one embodiment, the polyvinylidene fluoride hexafluoropropylene (P(VdF-HFP)) may be preferable. When hexafluoropropylene (HFP) is present in an amount of about 4 wt % to about 20 wt % in the P(VdF-HFP), positive active material adherence may be improved.

The conductive material is included to improve electrode conductivity. Any electrically conductive material may be used as a conductive material unless it causes a chemical change. Examples of the conductive material include polyphenylene derivatives, natural graphite, artificial graphite, carbon black, acetylene black, ketjen black, carbon fiber, and metal powders and metal fiber including copper, nickel, aluminum silver, and the like.

In one embodiment, for a positive active material $LiCoO_2$, $LiMn_2O_4$, $LiFePO_4$, and combinations thereof may be preferably selected, for a binder polyvinylidene fluoride hexafluoro propylene (P(VdF-HFP)) may be used, and for a conductive material acetyleneblack, ketjenblack, carbon fiber and combinations thereof may be preferably selected.

The negative electrode 112 includes a current collector and a negative active material layer positioned on the current collector. The negative electrode 112 may include the same composition as in the positive electrode 114 with respect to the relative amounts of the negative active material, conductive material and binder.

The current collector may include a copper foil, a nickel foil, a stainless steel foil, a titanium foil, a nickel foil, a polymer substrate coated with conductive metals, and a metal net such as a metal mesh, but is not limited thereto.

The negative active material layer may include a negative active material, a conductive material, and a binder.

For the negative active material, a material that reversibly intercalates/deintercalates lithium ions, lithium, lithium alloy, a material being capable of alloying with lithium, materials being doping and dedoping lithium, transition metal oxide, or combinations thereof may be used. The material that reversibly intercalates/deintercalates lithium ions includes carbon-based negative active materials.

The carbon-based negative active materials may be selected from crystalline carbon, amorphous carbon, or combination thereof. The crystalline carbon may be non-shaped, or sheet, flake, spherical, or fiber shaped natural graphite or artificial graphite. The amorphous carbon may be a soft carbon (carbon obtained through sintering at a low temperature), a hard carbon (carbon obtained through sintering at a high temperature), mesophase pitch carbide, fired coke, and so on.

The materials being capable of alloying with lithium includes an element selected from the group consisting of Na, K, Rb, Cs, Fr, Be, Mg, Ca, Sr, Ba, Ra, Ti, Ag, Zn, Cd, Al, Ga, In, Si, Ge, Sn, Pb, Sb, Bi, and combinations thereof.

Examples of the transition elements oxide, compounds being doping and dedoping lithium, or compounds being capable of reversibly reacting lithium include one selected from the group consisting of vanadium oxide, lithium vanadium oxide, Si, $SiO_x$ ($0 < x < 2$), Sn, $SnO_2$, composite tin alloys, and combinations thereof. The conductive material and binder are the same as in described above.

The separator 113 may be a single layer or multilayer, for example made of polyethylene, polypropylene, polyvinylidene fluoride, or combinations thereof.

The electrolyte includes a non-aqueous organic solvent and a lithium salt.

The non-aqueous organic solvent acts as a medium for transmitting lithium ions, and examples of the organic solvent include one selected from the group consisting of carbonate-based, ester-based, ether-based, ketone-based, alcohol-based, or aprotic solvents.

Non-limiting examples of the carbonate-based solvents includes dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When the linear carbonate compounds and cyclic carbonate compounds are mixed, an organic solvent having high dielectric constant and low viscosity can be provided. The cyclic carbonate compounds and linear carbonate compounds may be mixed together at a volume ratio of about 1:1 to about 1:9.

Non-limiting examples of the ester-based solvent include methylacetate, ethylacetate, n-propylacetate, dimethylacetate, methylpropinonate, ethylpropinonate, γ-butyrolactone, decanolide, valerolactone, mevalonolactone, caprolactone, and the like. Non-limiting examples of the ether-based solvent include dibutylether, tetraglyme, diglyme, dimethoxyethane, 2-methyltetrahydrofuran, tetrahydrofuran, and the like, and non-limiting examples of the ketone-based solvent include cyclohexanone, and the like. Non-limiting examples of the alcohol-based solvent include ethanol, isopropyl alcohol, and the like.

The non-aqueous organic solvent may be used singularly or in a composition. When the organic solvent is used in a composition, a composition ratio can be controlled in accordance with a desirable battery performance.

The non-aqueous electrolyte may further include overcharge inhibitor additives such as ethylene carbonate, pyrocarbonate, and the like.

Hereinafter, a method of manufacturing a positive electrode for a rechargeable lithium battery according to another embodiment is described with reference to FIG. 4 together with FIGS. 1 to 3.

Figure 4:
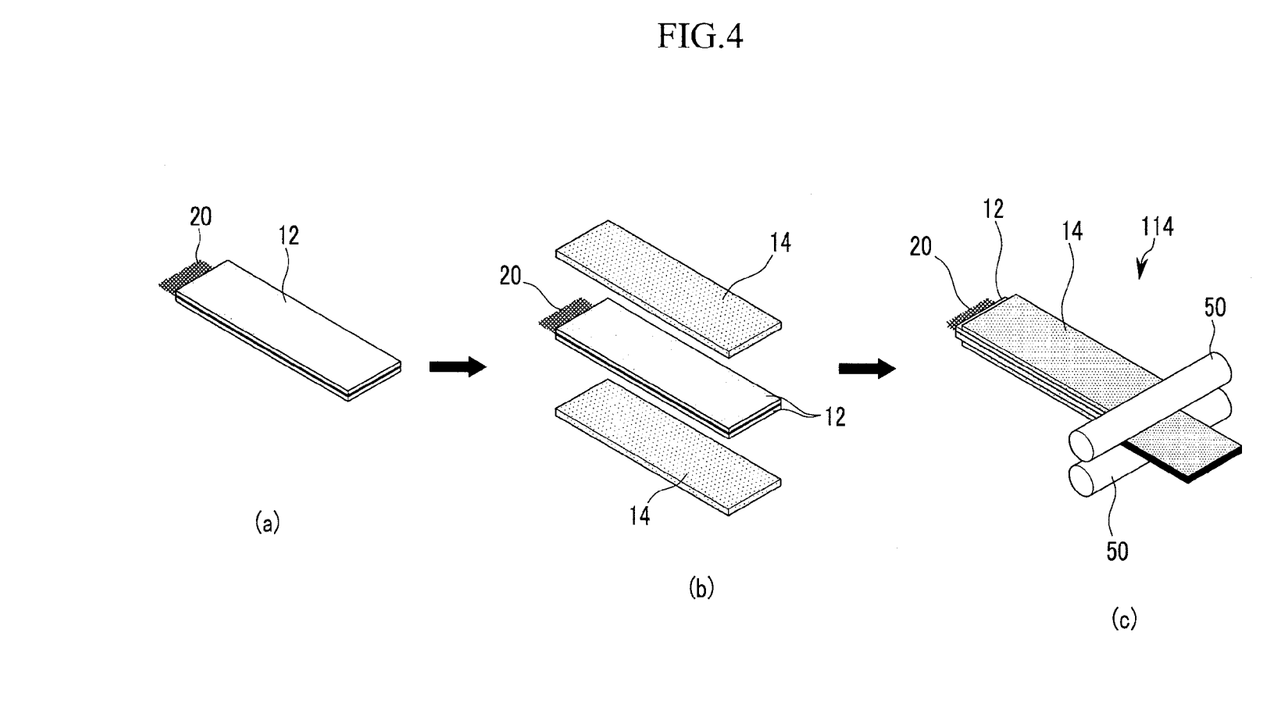
FIG. 4 is a schematic diagram showing a method of manufacturing a positive electrode for a rechargeable lithium battery according to one embodiment of the present invention.

FIG. 4 is a schematic diagram showing a method of manufacturing a positive electrode for a rechargeable lithium battery according to one embodiment.

Firstly, it prepares a first positive electrode composition and a second positive electrode composition in which each includes a positive active material, a binder, and a conductive material and has the different amount of conductive material.

The first positive electrode composition may include a higher amount of the conductive material than that of the positive active material, for example, it may include about 20 wt % to about 35 wt % of the positive active material, about 40 wt % to about 60 wt % of the conductive material, and about 5 wt % to about 40 wt % of the binder.

The second positive electrode composition may include the higher amount of the positive active material than that of the conductive material, for example, it may include about 80 wt % to about 95 wt % of the positive active material, about 1 wt % to about 10 wt % of the conductive material, and about 4 wt % to about 10 wt % of the binder.

The first positive electrode composition and the second positive electrode composition may be prepared in a form of slurry. In one embodiment, as shown in FIG. 4 (a), the first positive electrode composition is coated on both surfaces of the current collector 20 having a mesh type to form a first positive electrode composition layer (12). The coating may be carried out, for example, by spraying or dipping. In one embodiment, the second positive electrode composition is coated on an inorganic plate, such as glass, or an organic plate, such as polymer (not shown), to provide a second positive electrode composition layer 14.

In one embodiment, as shown in FIG. 4 (b), the second positive electrode composition layers 14 are disposed on both surfaces of the current collector 20 that the first positive electrode composition layers 12 are coated on. However, the number of the first positive electrode composition layer 12 and the second positive electrode composition layer 14 is not limited thereto, and the first positive electrode composition layer 12 and the second positive electrode composition layer 14 may be disposed only one surface of current collector 20, or they may be disposed on the current collector 20 in more numbers in the center of current collector 20.

Then, in one embodiment, as shown in FIG. 4 (c), the current collector 20, the first positive electrode composition layer 12, and the second positive electrode composition layer 14 are pressed from top and bottom with a compressor 50 such as a roller at a predetermined temperature. The pressing may be performed with thermal pressing at a temperature of about 150° C. to about 170° C., and may be performed for two or more times, if required.

According to one embodiment, it is possible to provide a battery with high capacity and high efficiency characteristics as well as to provide the positive electrode with the high conductivity by the means of including a plurality of positive electrode composition layers in which each has the different amounts of positive active material and conductive material.

In addition, it is possible to prevent the positive electrode composition from separating from a current collector or cracking on a surface of the electrodes to improve the battery performance.

According to at least one embodiment, when the positive electrode composition layer is disposed at least one surface of the current collector and pressed from top and bottom at the same time, it is possible to prevent cracking by the difference between the dry speed of solvent in the positive electrode composition layer contacting to the current collector and that in the positive electrode composition layer contacting to air. Furthermore, it is possible to decrease the thickness of current collector by using a mesh-typed current collector and to improve the adhesive property between positive electrode composition layers, so as to improve the battery performance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode for a rechargeable lithium battery, the electrode comprising:
   a current collector; a first electrode composition layer formed directly on a first surface of the current collector; and
   a second electrode composition layer farther than the first electrode composition layer from the current collector,
   wherein each of the first and second electrode composition layers comprises an active material and a conductive material, wherein the amount of the conductive material of the first electrode composition layer is different from the amount of the conductive material of the second electrode composition layer, wherein the weight of the conductive material of the first electrode composition layer is greater than the weight of the active material of the first electrode composition layer, and
   wherein the second electrode composition layer further comprises about 4 wt % to about 10 wt % of a binder,
   wherein the first electrode composition layer is further formed at least directly on a second surface of the current collector, wherein the first and second surfaces are opposing each other, and wherein the second electrode composition layer is formed directly on opposing surfaces of the first electrode composition layer farther than the first electrode composition layer from the current collector,
   wherein the electrode further comprises:
   an additional first electrode composition layer formed on opposing surfaces of the second electrode composition layer farther than the second electrode composition layer from the current collector, wherein the additional first electrode composition layer has the same wt % of conductive material as the first electrode composition layer; and
   an additional second electrode composition layer formed on opposing surfaces of the additional first electrode composition layer farther than the additional first electrode composition layer from the current collector, wherein the additional second electrode composition layer has the same wt % of conductive material as the second electrode composition layer.

2. The electrode of claim 1, wherein the amount of the conductive material of the first electrode composition layer is greater than the amount of the conductive material of the second electrode composition layer.

3. The electrode of claim 1, wherein the second electrode composition layer comprises a higher amount of the active material than the amount of the conductive material.

4. The electrode of claim 1, wherein the current collector is porous.

5. The electrode of claim 1, wherein the current collector is mesh-type.

6. The electrode of claim 1, wherein the electrode is a positive electrode.

7. The electrode of claim 6, wherein the second electrode composition layer comprises about 80 wt % to about 95 wt % of the active material and about 1 wt % to about 10 wt % of the conductive material.

8. The electrode of claim 6, wherein the first electrode composition layer has a thickness of about 5 µm to about 200 µm, and wherein the second electrode composition layer has a thickness of about 100 µm to about 500 µm.

9. The electrode of claim 6, wherein the first electrode composition layer comprises about 40 wt % to about 60 wt % of the conductive material and about 20 wt % to about 35 wt % of the positive active material.

10. The electrode of claim 9, wherein the first electrode composition layer further comprises a binder, and wherein the first electrode composition layer comprises about 5 wt % to about 40 wt % of the binder.

11. The electrode of claim 6, wherein the positive electrode is thicker than about 300 µm.

12. The electrode of claim 11, wherein the positive electrode has a thickness of about 300 µm to about 1200 µm.

13. The electrode of claim 6, wherein the positive electrode has an average porosity of about 30% or more, and wherein the average porosity represents the total volume ratio of inside pores of the positive electrode.

14. The electrode of claim 13, wherein the average porosity of the positive electrode is from about 30% to about 50%.

15. A rechargeable lithium battery, comprising:
a positive electrode;
a negative electrode; and
a separator interposed between the positive and negative electrodes;
wherein at least one of the positive and negative electrodes comprises:
a current collector;
a first electrode composition layer formed directly on a first surface of the current collector; and
a second electrode composition layer farther than the first electrode composition layer from the current collector,
wherein each of the first and second electrode composition layers comprises an active material and a conductive material, wherein the amount of the conductive material of the first electrode composition layer is different from the amount of the conductive material of the second electrode composition layer, and wherein the weight of the conductive material of the first electrode composition layer is greater than the weight of the active material of the first electrode composition layer, and
wherein the second electrode composition layer further comprises about 4 wt % to about 10 wt % of a binder,
wherein the first electrode composition layer is further formed at least directly on a second surface of the current collector, wherein the first and second surfaces are opposing each other, and wherein the second electrode composition layer is formed directly on opposing surfaces of the first electrode composition layer farther than the first electrode composition layer from the current collector,
wherein the at least one of the positive and negative electrodes further comprises:
an additional first electrode composition layer formed on opposing surfaces of the second electrode composition layer farther than the second electrode composition layer from the current collector, wherein the additional first electrode composition layer has the same wt % of conductive material as the first electrode composition layer; and
an additional second electrode composition layer formed on opposing surfaces of the additional first electrode composition layer farther than the additional first electrode composition layer from the current collector, wherein the additional second electrode composition layer has the same wt % of conductive material as the second electrode composition layer.

16. The rechargeable lithium battery of claim 15, wherein the amount of the conductive material of the first electrode composition layer is greater than the amount of the conductive material of the second electrode composition layer.

17. The rechargeable lithium battery of claim 15, wherein the at least one electrode is the positive electrode.

* * * * *